INVENTOR.
James W. Jacobs

April 14, 1959 J. W. JACOBS 2,881,597
TWO SPEED DRIVE AND CONTROL MEANS FOR REFRIGERATING APPARATUS
Filed May 26, 1955 6 Sheets-Sheet 2

INVENTOR.
James W. Jacobs
BY
His Attorney

INVENTOR.
James W. Jacobs
BY
His Attorney

April 14, 1959     J. W. JACOBS     2,881,597
TWO SPEED DRIVE AND CONTROL MEANS FOR REFRIGERATING APPARATUS
Filed May 26, 1955     6 Sheets-Sheet 4
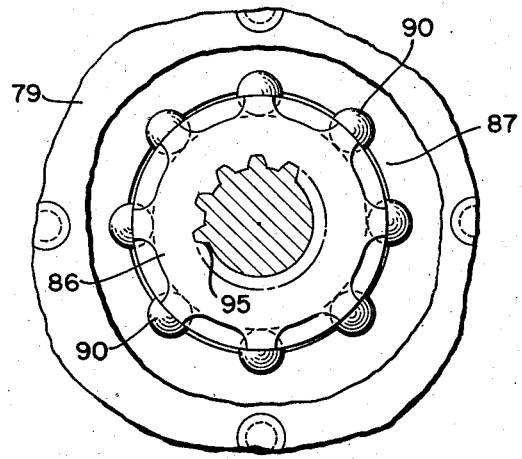
Fig. 5
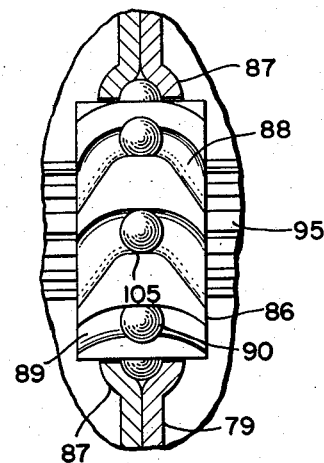
Fig. 6
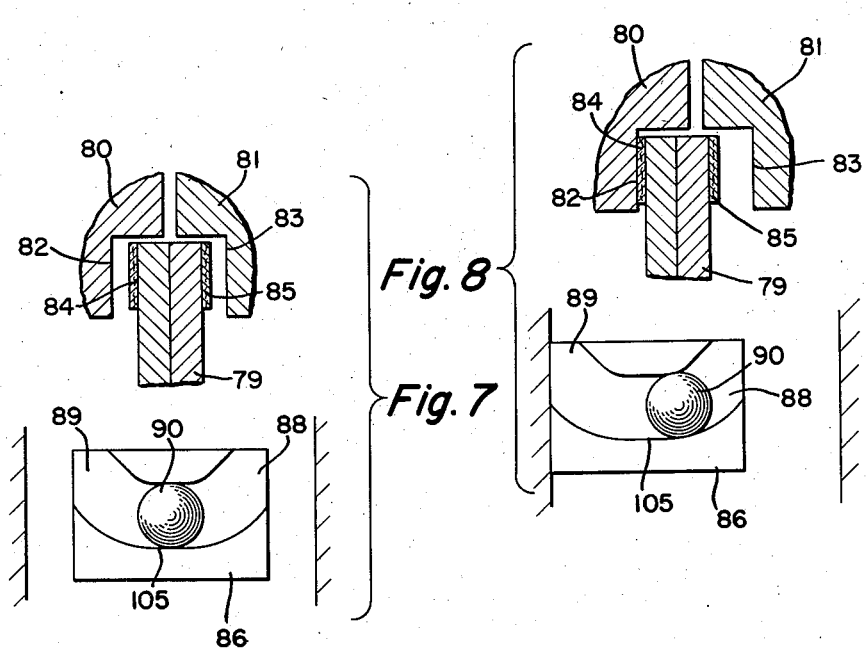
Fig. 8
Fig. 7
INVENTOR.
James W. Jacobs
BY
His Attorney April 14, 1959     J. W. JACOBS     2,881,597
TWO SPEED DRIVE AND CONTROL MEANS FOR REFRIGERATING APPARATUS
Filed May 26, 1955     6 Sheets-Sheet 5

INVENTOR.
James W. Jacobs
BY R. R. Candor
His Attorney

INVENTOR.
James W. Jacobs
BY
His Attorney 2,881,597

United States Patent Office

Patented Apr. 14, 1959

2,881,597

TWO SPEED DRIVE AND CONTROL MEANS FOR REFRIGERATING APPARATUS

James W. Jacobs, Dayton, Ohio, assignor to General Motors Corporation, Detroit, Mich., a corporation of Delaware Application May 26, 1955, Serial No. 511,302

13 Claims. (Cl. 62—133)

This invention relates to refrigerating apparatus and more particularly to a clutch for driving the refrigerant compressor of an air conditioning system for automobiles, or the like.

This application is a continuation in part of my copending applications S.N. 373,853 filed August 12, 1953, S.N. 471,625 and S.N. 471,708 both filed November 29, 1954, and all of which issued on September 24, 1957, as Patents Nos. 2,807,172, 2,807,147 and 2,807,148, respectively. This application is also a continuation-in-part of S.N. 418,931 filed March 26, 1954, and S.N. 498,548 filed April 1, 1955, which issued on March 4, 1958, as Patent 2,825,233.

An object of this invention is to provide a clutch between a power member and a driven device to be driven by said power member, together with electromagnetic means responsive to momentary electric impulses to engage and sustain engaged and to disengage and sustain disengaged said clutch.

Another object of this invention is to provide a clutch according to the foregoing object which includes a teaser disk construction and a self-energizing construction.

Another object of this invention is to provide a power member and a driven device to be driven by said power member, with a high speed ratio clutch and a low speed ratio clutch connected between said power member and said driven device and having electromagnetic means responsive to momentary electric impulses selectively to engage and sustain engaged and to disengage and sustain disengaged either of said clutches.

Another object of this invention is to provide a construction according to the foregoing object in which the clutches include a teaser disk construction and a self-energizing construction.

Another object of this invention is to provide constructions according to any of the foregoing objects in which the control is in response to a speed condition and/or to a refrigeration condition.

While the invention has been shown specifically applied to a compressor of an air conditioning system, many of its features are applicable to other driving and driven devices.

Further objects and advantages of the present invention will be apparent from the following description, reference being had to the accompanying drawings wherein a preferred form of the invention is clearly shown.

In the drawings:

Figure 5 is a transverse cross-section taken along the line 5—5 of Figure 4.

Figure 6 is a cross-section taken on a curved plane along the line 6—6 of Figure 4.

Figure 7 is a diagrammatic representation of the teaser disk and self-energizing constructions of Figure 4 in neutral or off position.

Figure 8 is a view similar to Figure 7 showing the teaser construction preparing for low speed ratio.

Figure 1:
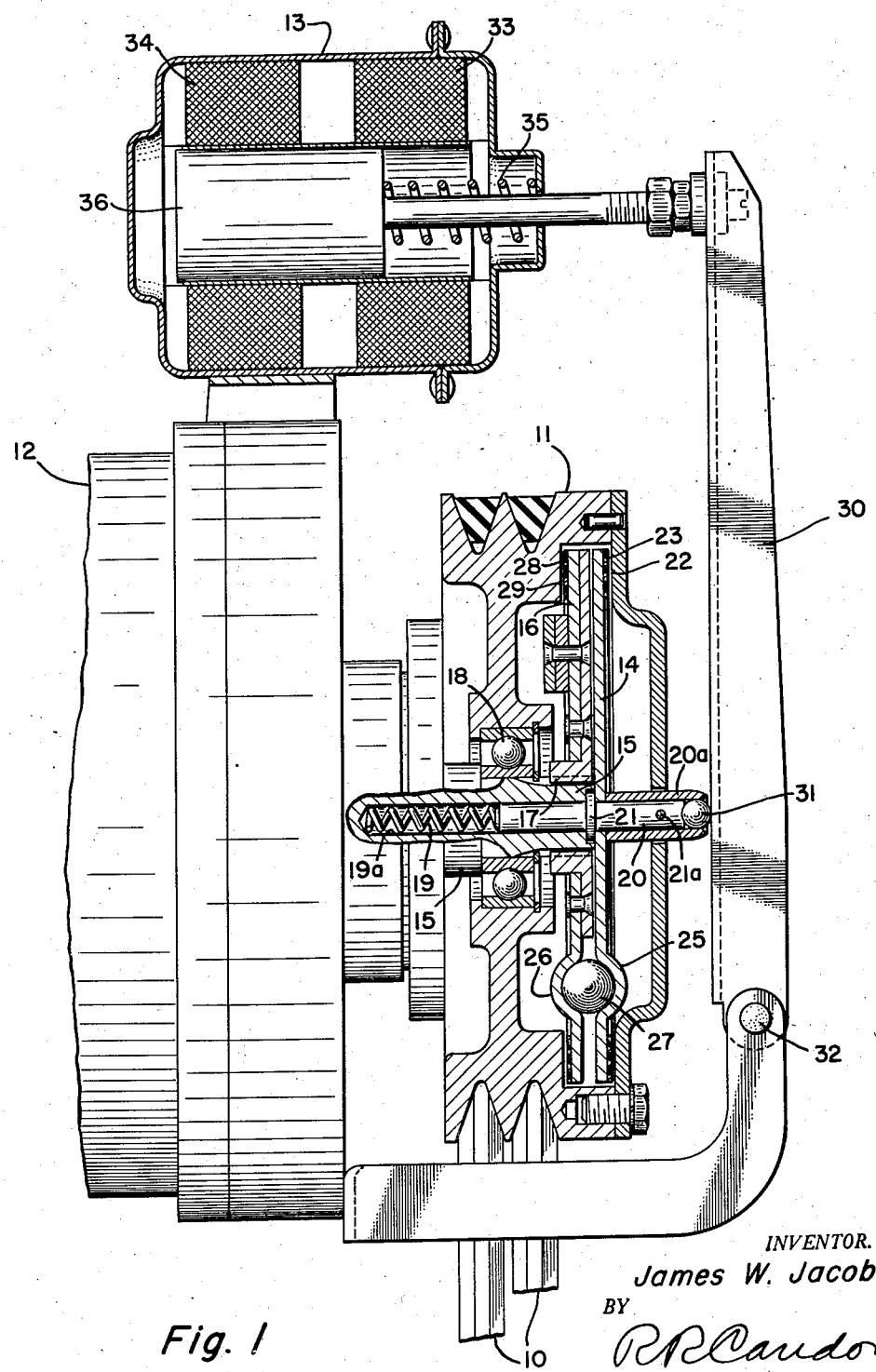
Figure 1 is a vertical cross-section of a clutch embodying features of my invention.
Figure 2:
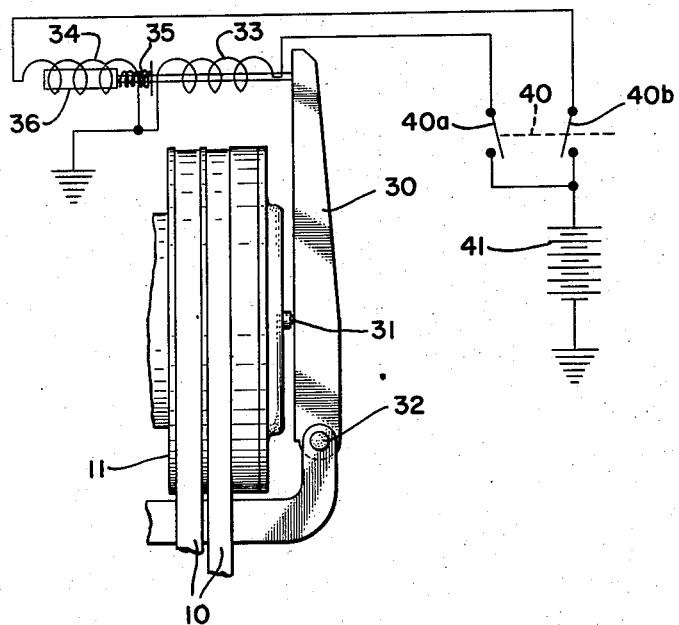
Figure 2 is a partial wiring diagram for controlling the clutch of Figure 1.

Referring first to Figures 1 and 2, a power member, such as an automobile engine shown in other figures, drives the belts 10 to rotate the pulley 11. A device to be driven, such as a refrigerant compressor 12, is used in an air conditioning system. A clutch construction is drivingly connected between said power member and said driven device 12 and includes an electromagnetic means 13 responsive to momentary electric impulses to engage and sustain engaged and to disengage and sustain disengaged the clutch construction.

To this end, the clutch includes a teaser disk 14 which is axially and rotationally free with respect to the compressor shaft 15. A clutch disk 16 is axially free but rotationally fixed with respect to the compressor shaft 15, this being accomplished by the splined construction 17. The pulley 11 is rotationally free but axially fixed on the shaft 15 by means of the ball bearing construction 18. A spring 19, within a bore 19a in shaft 15, pushes the pin 20 rightward in Figure 1 in such a manner that, if permitted to do so, it pushes the teaser disk 14, through the medium of transverse flange 21, against the inwardly directed frictional surface 22 of the pulley 11. The frictional surface 23 on the teaser disk 14 causes the disk 14 to rotate relatively to the disk 16 which tends to be stationary. The spread reaction means including the teardrops 25 and 26 and the balls 27 cause the disks 14 and 16 to spread apart and the disk faces 23 and 28 to engage respectively the inwardly directed friction faces 22 and 29 of the pulley 11, so that the compressor 12 is driven.

The pin 20 is provided with a sleeve 20a which engages the outer side of disk 14. The sleeve 20a is secured to the pin 20 by means of the cross pin 21a. The ball construction 31 is held between the end of pin 20 and the tapered end of sleeve 20a. The leftward movement of disk 14 is limited by the splined end of shaft 15.

The lever 30 engages the pin 20 through the ball construction 31 and is pivoted at 32. The electromagnetic means includes an engaging solenoid 33 and a deengaging solenoid 34. A spring 35, bearing against the armature 36, tends to push the armature 36 leftward. The power of spring 35 is stronger than the power of the spring 19, and overcomes it when the clutch is stationary, but is not strong enough to overcome the combined rightward impulse of the spring 19 and of the ball and teardrop constructions 25, 26 and 27 when the clutch is engaged and rotating.

Consequently, if a short impulse energizes the engaging solenoid 33, the solenoid overcomes the spring 35 and pulls the armature 36 rightward, together with the lever 30 and permits the spring 19 to move the teaser disk 14 rightward and engage the clutch as heretofore described. If the electrical impulse is then discontinued, the clutch continues to drive the compressor because the combined power of the ball and teardrop constructions 25, 26 and 27 and of the spring 19 is greater than the power of the spring 35. If a momentary impulse is sent to the disengaging solenoid 34, the armature 36 is pulled leftward with sufficient power to overcome the combined power of the ball and teardrop constructions 25, 26 and 27 and of the spring 19, so that the combined pull of the solenoid 34 and the spring 35 move the armature 36 leftward to disengage the clutch and it will be maintained disengaged by the spring 35 even if the impulse to the solenoid 34 is stopped. The clutch will then remain disengaged unitl the solenoid 33 is again momentarily energized.

In Figure 2, the solenoids 33 and 34 are shown diagrammatically, as well as the spring 35. A switch 40 is diagrammatically shown which is capable of momentarily energizing the solenoids 33 and 34 by temporarily connecting them to the battery 41 selectively through blades 40a and 40b. Any switch construction capable of sending momentary electric impulses to the solenoids may be used.

Figure 3:
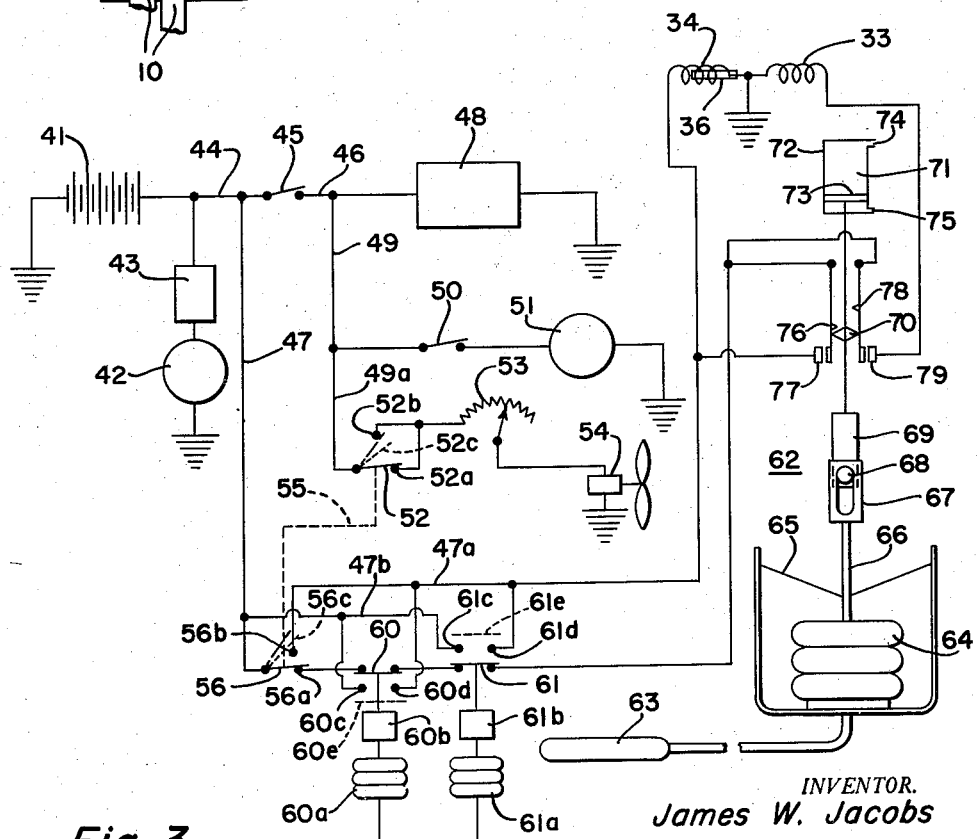
Figure 3 is a wiring diagram showing how the construction of Figures 1 and 2 may be applied to an air conditioning system of an automobile.

Figure 3 shows a construction capable of sending momentary impulses to the clutch construction of Figures 1 and 2 when applied to an automobile air conditioning system. For example, the battery 41 may be the usual automobile battery which is charged by the generator 42 through the medium of the usual voltage regulator and cut-out 43. The line 44 may be connected to an ignition switch 45 which opens and closes the line 46. The line 46 leads to the ignition system 48 while the branch 49 leads to the usual starter switch 50 which energizes the starter motor 51 for starting the engine. The line 49a leads to an air blower switch blade 52 closing on stationary contacts 52a and 52b and having an intermediate "off" position 52c. When the switch 52 is in the position shown in Figure 3, it closes upon the contact 52a to energize the adjustable rheostat 53 and adjustably to energize the fan and motor 54 for blowing air over the air conditioning evaporator. The switch 52 is tied by linkage 55 with switch 56 to produce refrigeration, as more fully hereafter described. The switches 52 and 56 may be moved to an intermediate "off" position 52c and 56c where neither air conditioning nor air circulation is produced, or they may be moved to the dotted line position where only the contact 52b is closed and only air circulation is produced.

The line 47 leads from the line 44 to air conditioning switch blade 56 on contact 56a connected to the switches 60, 61 and through the momentary switch construction 62 momentarily and selectively to energize the solenoids 33 and 34, provided all of the other switches are closed.

The momentary switch 62 includes thermostat bulb 63 responsive to the temperature of the space being conditioned and which expands and contracts the bellows 64 in response thereto. The snap acting springs 65 transform the slow expansion and contraction of the bellows 64 into a snap action of the rod 66 which is connected to the slotted sleeve 67. A pin 68 is carried by a telescoped plunger 69 connected to the vertically movable contact 70. The contact 70 is permitted to move from its lower to its upper position somewhat rapidly, but with a slight delay caused by a delay device 71 which includes the cylinder 72 and piston 73 together with the slow leak openings 74 and 75. As the member 70 moves upwardly, it moves the blade 76 leftward and closes the contacts 77 momentarily to energize the declutching solenoid 34. As the member 70 continues to move upwardly, it moves the blade construction 78 rightward momentarily to close the contacts 79 and momentarily to energize the clutching solenoid 33.

The blade 56 momentarily touches the contact 56b as it is moved upwardly by manual snap acting on and off linkage 55 to off position 52c, 56c. Contact 56b is connected to line 47a which is connected to declutching solenoid 34, so that the momentary brushing of contact 56b momentarily energizes solenoid 34 and declutches the compressor. Switch 60 has bellows 60a connected to the low side of the refrigerating system so that blade 60 is snapped downwardly if the refrigerant pressure falls below a predetermined (freezing) limit. Snap acting mechanism 60b may be the same as members 65—75 heretofore described. Contacts 60c and 60d are connected respectively with lines 47b and 47a. As contacts 60c and 60d are temporarily brushed on the way to off position 60e, solenoid 34 is temporarily energized to declutch the compressor.

The switch 61 is provided with a bellows 61a connected to the high pressure side of the refrigerating system. The blade 61 is slowly snapped upward past contacts 61c and 61d on its way to the "off" position 61e. The snap acting mechanism 61b may be similar to 60b. Likewise, the momentary brushing of contacts 61c and 61d momentarily energizes the declutching solenoid 34 to stop the compressor.

In the operation of the system shown in Figure 3, and assuming that switches 52, 56, 60, 61 and 62 are in the full line positions shown in Figure 3, when the temperature of the compartment being conditioned rises above a predetermined limit, the bulb 63 is warmed and the bellows 64 snaps to the upper position and starts the contact member 70 upward. This causes the contacts 77 to be temporarily closed and the off solenoid 34 to be momentarily energized. However, since the clutch is already deenergized, the solenoid 34 does not change the conditions. However, as the contact member 70 continues to rise and temporarily closes the contact 79, the solenoid 33 is temporarily energized causing the armature 36 to be moved rightward together with the lever 30 of Figure 1, so that the clutch is engaged by the relative rotation of teaser disk 14. The contact member 70 continues to rise and allows the switch 79 to open after the clutch has been energized. The clutch continues to be engaged until such time as the bellows 64 pulls the member 70 downward when the final closing of the switch 77 momentarily energizes the solenoid 34 and declutches the clutch.

If the compressor is operating and if any of the switches 56, 60 or 61 should be moved to their off position, the line 47a will be temporarily energized by the respective brushing of contacts 56b, 60c—60d, or 61c—61d. This temporarily energizes off solenoid 34 and declutches the compressor.

Figure 4:
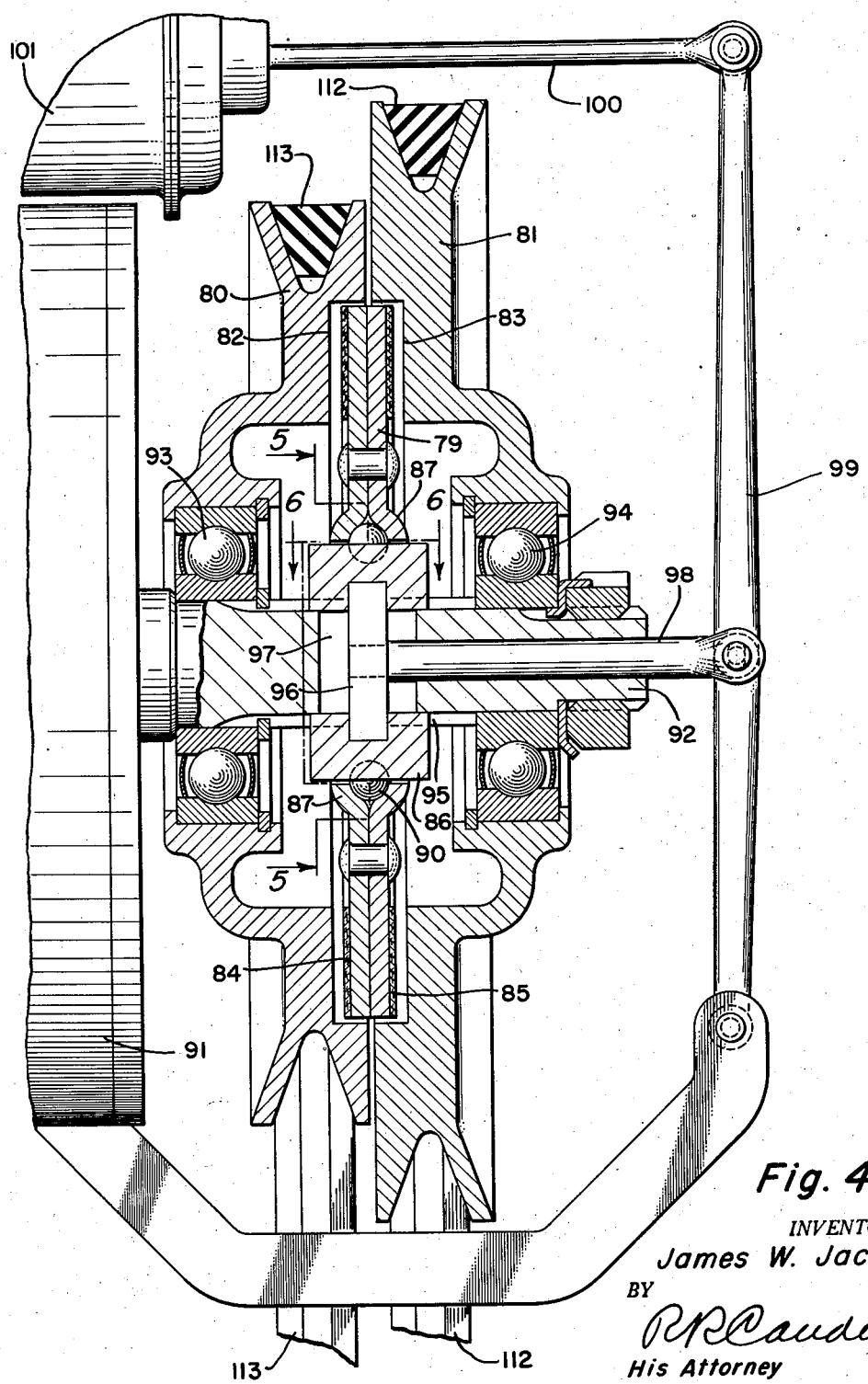
Figure 4 is a vertical cross-section of a high speed ratio and low speed ratio clutch.

In the construction shown in Figures 4 et seq., high speed pulley 80 and low speed clutch pulley 81 are provided with inwardly directed friction faces 82 and 83 respectively. A high speed teaser disk construction 84 and a low speed teaser disk construction 85 engage respectively the faces 82 and 83 whenever the hub 86 is moved leftward or rightward respectively. A self-energizing construction includes the ball sockets 87 and the ball grooves 88 and 89 together with the balls 90. When the hub 86 is moved leftward, the balls are moved into the groove portions 88, and the relative rotation between the hub 86 and the respective pulley 81 creates a locking construction which causes the compressor 91 to be driven at a low speed ratio. When the hub 86 is moved rightward, the balls 90 are moved into the groove constructions 89, and the relative rotation between the hub 86 and the pulley 80 causes the compressor to be driven at relatively high speed ratio as more fully hereafter described.

The foregoing is accomplished because the pulley 80 is rotationally free and axially fixed on the compressor shaft 92 through the medium of ball bearings 93. Likewise, the pulley 81 is rotationally free and axially fixed on the shaft 92 through the medium of ball bearings 94. The hub 86 is axially free and rotationally fixed on the shaft 92 through the medium of splines 95. The hub 86 may be moved rightward or leftward by means of a pin 96 which is axially movable in the slot 97 of the shaft 92 and is connected to a rod 98 in turn connected with the lever 99 and rod 100 leading to the electromagnetic means 101 hereafter to be described.

Figure 9:
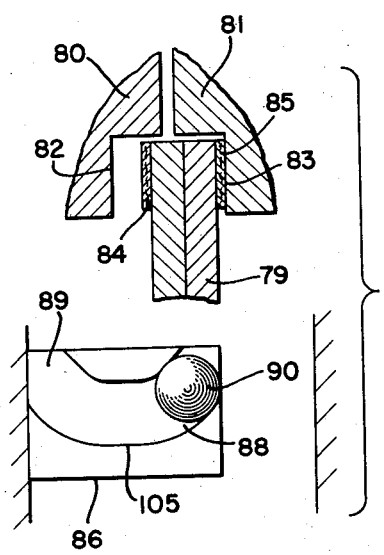
Figure 9 is a view similar to Figure 8 showing the self-energizing construction engaging the low speed ratio clutch.
Figure 10:
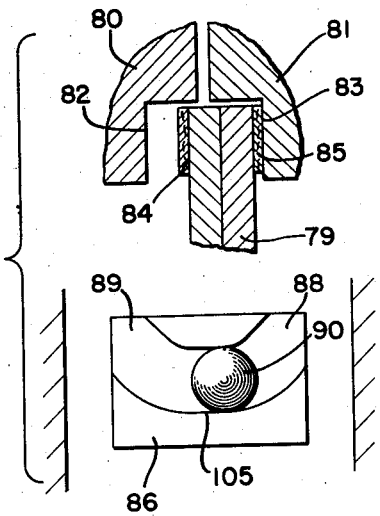
Figure 10 is a diagrammatic construction showing the teaser construction preparing to deenergize the low speed ratio clutch.
Figure 11:
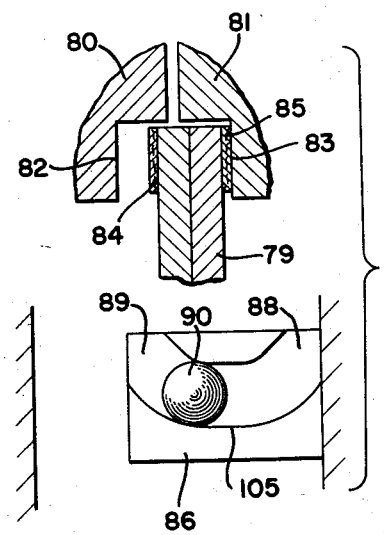
Figure 11 is a view similar to Figure 8, but showing the high speed ratio preparation.
Figure 12:
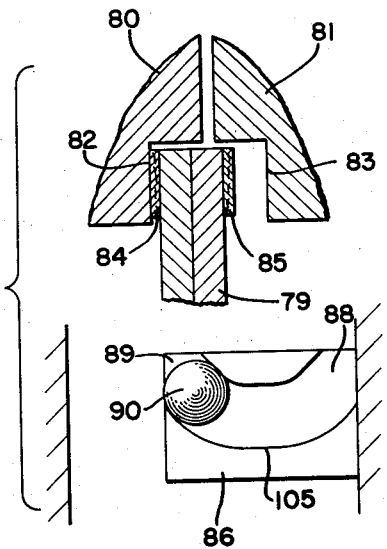
Figure 12 is a view similar to Figure 11 showing the self-energizing construction engaging the high speed ratio clutch.

Referring to Figures 7 through 12, when the hub 86 is in central position, as shown in Figure 7, the balls 90 ride in the flat portion 105 of the groove construction, and the disk friction faces 84 and 85 are free of the inwardly directed faces 82 and 83, so that the compressor is not driven. When the hub 86 is moved leftward, as shown in Figure 8, the face 84 temporarily engages the face 82 which is moving away from the plane of Figure 8. This causes a relative rotation between the disk construction and the hub 86, and causes the balls 90 to move from the flat portion 105 completely into the wedging portions 88 as indicated in Figure 9 with a consequent snapping of the disk 79 to cause engagement between the faces 85 and 83 as shown in Figure 9, so that the compressor is driven at the low speed ratio. When the hub 86 is moved to central position, as shown in Figure 10, the ball 90 moves to the flat portion 105, so that the disk 79 is then free to return to the neutral position originally shown in Figure 7. If the hub 86 is moved completely rightward, as shown in Figure 11, the ball construction 90 is moved to the beginning of wedge portion 89 of the groove construction and the relative rotation causes the faces 83 and 85 temporarily to be engaged sufficiently to wedge the ball construction 90 completely into 89, as shown in Figure 12, so that the relative rotation moves the disk 79 leftward to engage the faces 82 and 84. The compressor is driven at high speed ratio.

Figures 13, 14, 15:
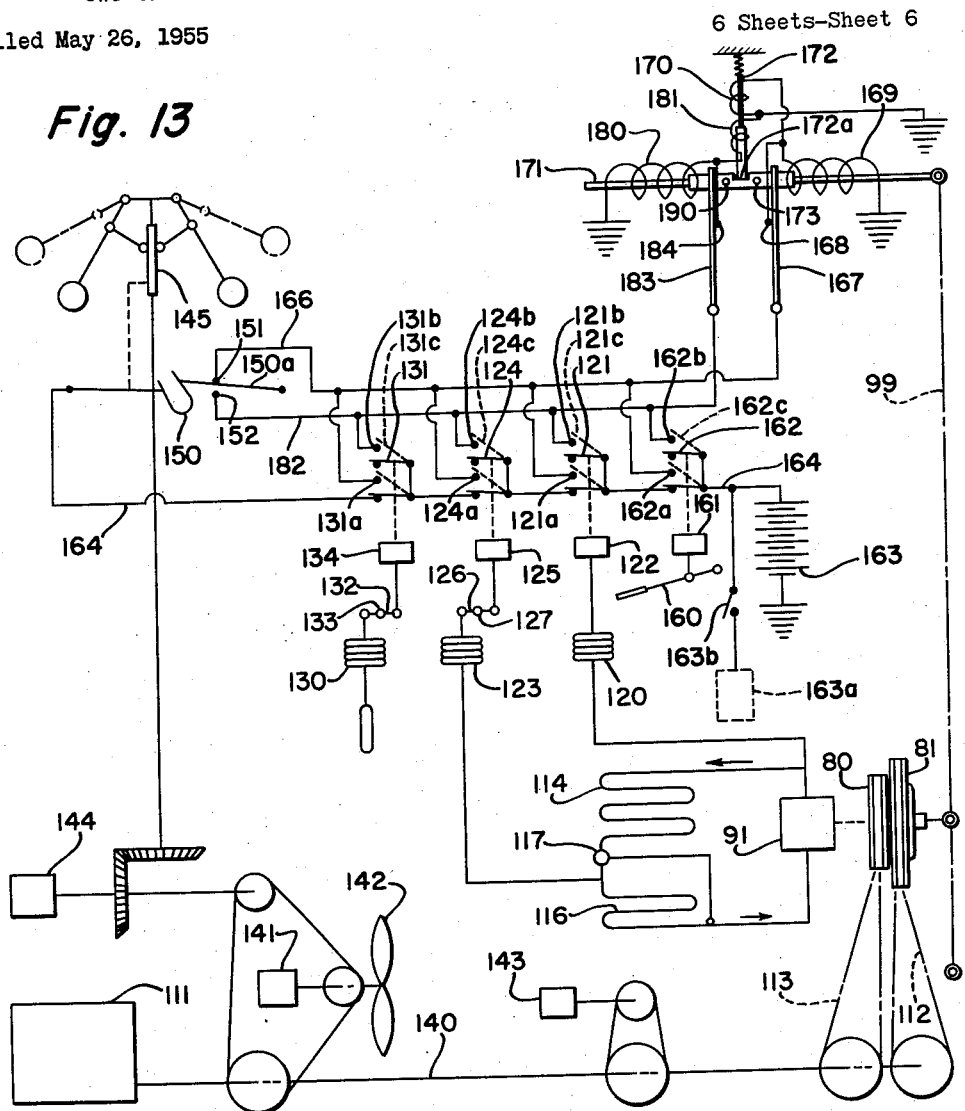
Figure 13 is a wiring diagram showing the high speed ratio and low speed ratio clutches applied to an automobile air conditioning system.
Figure 14 is a diagrammatic representation of the air conditioning system shown in Figure 13.
Figure 15 shows a modification of a momentary energizing control.

Referring to Figures 13 and 14, the automobile 110 is provided with an engine 111 which drives the low speed ratio belt 112 and the high speed ratio belt 113 respectively to drive the pulleys 81 and 80 of Figure 4, and the clutch construction drives the compressor 91 either at high speed ratio or at low speed ratio under varying conditions hereafter to be described.

The compressor 91 discharges compressed refrigerant into the condenser 114, from whence liquid refrigerant flows through the line 115 to the evaporator 116 through thermostatic expansion valve 117. The expanded refrigerant flows through the line 118 back to the compressor 91. If the high side refrigerant pressure is too high, the bellows 120 expands and moves the switch 121 to its upper position through the medium of a slow moving snap acting mechanism 122 similar to that shown in Figure 3. If the refrigerant pressure on the low side is too low, such as to cause frosting on evaporator 116, the bellows 123 moves the switch 124 to its upper position through the slow moving snap acting mechanism 125, also similar to that shown in Figure 3 and through the action of the reverse lever 126 fulcrumed at 127. When the temperature in the passenger compartment falls below a predetermined temperature, the bellows 130 moves the switch 131 to its upper position through a slow snap action construction 134 also similar to that disclosed in Figure 3 through the medium of the reverse lever 132, fulcrumed at 133.

Referring particularly to Figure 13, the engine 111 drives the shaft 140 which, through suitable pulley and belt constructions, drives the water pump 141, fan 142, power steering pump 143, generator 144 and centrifugal governor 145. It also drives the pulleys 80 and 81 through the belts 113 and 112. The governor 145 actuates the snap acting switch 150 which closes on contact 151 when the engine is running below a predetermined limit and closes on contact 152 when the engine speed rises above a predetermined limit. The construction is such that the electromagnetic means 101 is momentarily energized to engage the compressor with either the high speed clutch pulley 80 or the low speed clutch pulley 81, or to disengage them both depending upon conditions in the engine as more fully hereafter described.

A hand switch 160 acts through a slow snap action 161, similar to that shown in Figure 3, to move the switch 162 to its upper position or to its lower position. Assuming that it is in its lower position, and that the switches 121, 124 and 131 are also in their lower positions, as shown in Figure 13, then the battery 163 feeds the line 164 and the usual automobile electrical system 163a through one or more switches 163b. The battery also feeds C-spring switch 150, snap blade 150a and contact 151 to energize the line 166. The blade 167 is biased leftward, so that when it is energized by the line 166, it energizes the contact 168 and the solenoids 169 and 170. This pulls the armature 171 rightward and the armature 172 upward until the pin 173, on armature 171, strikes the blade 167 and opens the contact 168. However, the rightward movement of the armature 171 moves the lever 99 rightward, which in turn moves the hub 86 rightward to produce the engagements shown in Figures 11 and 12 which cause the compressor to be driven at a high speed ratio. The wedging action shown in Figure 12 maintains the lever 99 in the rightward position until such time as both solenoids 180 and 181 are temporarily energized together or when all four solenoids 169, 170, 180 and 181 are energized together. This occurs when switch blade 150a engages the contact 152 or whenever any of the switches 162, 121, 124 and 131 are moved upwardly. When the engine speed rises above a predetermined limit, the compressor 191 is driven at the relatively low speed ratio through clutch pulley 81. This occurs when the governor 145 snaps the blade 150a downward into contact with 152 which energizes line 182 and deenergizes line 166. This energizes the blade 183 which is biased rightward and energizes the contact 184 temporarily to energize the solenoids 180 and 181. This pulls the armature 171 leftward and the armature 172 upward until the pin 190, on solenoid 171, engages the blade 183 and opens the contact 184. However, the consequent leftward movement of the lever 99 moves the hub 86 leftward to produce the driving conditions shown in Figures 8 and 9, so that the compressor is driven at a low speed ratio.

When any of the switches 121, 124, 131 and/or 162 are slowly snapped upward, both the lines 166 and 182 are temporarily simulanteously energized as the switches temporarily brush past the respective contacts 121a—121b, 124a—124b, 131a—131b, and/or 162a—162b. This causes all four solenoids 169, 170, 180 and 181 to be simultaneously and temporarily energized to move the armature 171 to the neutral central position. The four solenoids are then simultaneously deenergized by the final upward movement of any of the switches into positions 121c, 124c, 131c and/or 162c. This causes armature 172 to lock armature 171 by movement into slot 172a. This stops the compressor because the lever 99 is moved to the neutral position to produce a condition shown in Figure 7, and the compressor is not driven.

The construction shown in Figure 15 may be substituted for the solenoid construction of Figure 13. Temporary energization of solenoids 200 and 201 is accomplished by the leftward biased blade 202 and the rightward biased blade 203 which energize the contacts 204 and 205 respectively and are opened by the pins 206 and 207 respectively, since they are carried by the armature 208. The armature 208 is connected by rod 209 with a snap acting mechanism 210 which includes the valleys 211, 212 and 213 over which the ball and spring construction 214 rides. A roller 215 maintains the construction 214 against the ball and spring construction 214. The roller passes the creasts of the hills 216 and 217 before the respective pins 207 and 206 open the switches 205 and 204.

In the operation of the modification of Figures 4 through 14, when the switches are in the full line positions of Figure 13, the solenoids 169 and 170 have just been energized temporarily, so the armature 172 will be lifted and the armature 171 will be moved rightward, thus moving the lever 99 rightward to produce the conditions shown in Figures 11 and 12 to produce a high speed ratio drive of the compressor 91. When the engine speed rises, the governor 145 snaps blade 150a downward to energize line 182 and deenergize line 166. This temporarily energizes solenoids 180 and 181 to lift armature 172 and move armature 171 leftward to move lever 99 leftward and produce the conditions shown in Figures 8 and 9 to drive the compressor at low speed ratio. If any of the switches 121, 124, 131 or 162 are snapped upwardly, they will open line 164 but will temporarily energize both lines 166 and 182 simultaneously and temporarily to energize all four solenoids 169, 170, 180 and 181 to center the armature 171 and to lock it in place by the subsequent dropping of armature 172 when both lines are deenergized when the particular switch 121, 124, 131, or 162 reaches its final off position 121c, 124c, 131c, or 162c. When armature 171 is so centered, it also centers lever 99 to produce the conditions shown in Figure 7 so the compressor is not driven.

The operation of Figure 15 is substantially the same as heretofore described for Figure 13, except that only two solenoids are required and the locking is produced by the hill and valley construction 210.

While the form of embodiment of the invention as herein disclosed constitutes a preferred form, it is to be understood that other forms might be adopted as may come within the scope of the claims which follow.

What is claimed is as follows:

1. In combination: a power member; a driven device to be driven by said power member; a high speed ratio clutch connected between said power member and said driven device and including a teaser disk construction and a self-energizing construction to engage and sustain engaged and to disengage and sustain disengaged said high speed ratio clutch; a low speed ratio clutch connected between said power member and said driven device and including a teaser disk construction and a self-energizing construction to engage and sustain engaged and to disengage and sustain disengaged said low speed ratio clutch; electromagnetic means to move said teaser disk constructions and said self-energizing constructions to engaging and disengaging positions; and fluid measure operated means to momentarily energize and immediately deenergize said electromagnetic means selectively to engage and disengage either said high speed ratio clutch or said low speed ratio clutch.

2. In combination: a power member; a driven device to be driven by said power member; a high speed ratio clutch connected between said power member and said driven device and including a teaser disk construction and a self-energizing construction to engage and sustain engaged and to disengage and sustain disengaged said high speed ratio clutch; a low speed ratio clutch connected between said power member and said driven device and including a teaser disk construction and a self-energizing construction to engage and sustain engaged and to disengage and sustain disengaged said low speed ratio clutch; electromagnetic means to move said teaser disk constructions and said self-energizing constructions to engaging and disengaging positions; and means to momentarily energize and immediately deenergize said electromagnetic means selectively to engage and disengage either said high speed ratio clutch or said low speed ratio clutch in response to a speed condition.

3. In combination: an engine, a refrigerating system including an evaporator for cooling a medium, condenser and compressor to be driven by said engine; a clutch drivingly connected between said engine and said compressor and including a teaser disk construction and a self-energizing construction to engage and sustain engaged and to disengage and sustain disengaged said clutch; electromagnetic means to move said teaser disk construction and said self-energizing construction to engaging and disengaging position; and means responsive to the temperature of said medium to momentarily energize and immediately deenergize said electromagnetic means selectively to engage and disengage said clutch.

4. In combination: an engine; a refrigerating system including an evaporator for cooling a medium, condenser and compressor to be driven by said engine; a high speed ratio clutch connected between said engine and said driven device and including a teaser disk construction and a self-energizing construction to engage and sustain engaged and to disengage and sustain disengaged said high speed ratio clutch; a low speed ratio clutch connected between said engine and said driven device and including a teaser disk construction and a self-energizing construction to engage and sustain engaged and to disengage and sustain disengaged said low speed ratio clutch; electromagnetic means to move said teaser disk constructions and said self-energizing constructions to engaging and disengaging positions; and means responsive to the temperature of said medium to momentarily energize and immediately deenergize said electromagnetic means selectively to engage and disengage either said high speed ratio clutch or said low speed ratio clutch.

5. In combination, a power member, a driven device, a clutch for connecting and disconnecting said member and said device, said clutch having means for holding it in either the connected or disconnected position, double acting electrical operating means for moving the clutch to and from the connected and disconnected positions, said electrical operating means having one operating element for moving the clutch to the connected position and a second operating element for moving the clutch to the disconnected position, and fluid pressure operated control means having means for momentarily energizing and immediately deenergizing said one element to move the clutch to the connected position and having means for momentarily energizing and immediately deenergizing said second element to move the clutch to the disconnected position.

6. In combinaiton, a variable speed power member, a driven device, a high ratio drive and a low ratio drive connecting said power member and said device, alternately operating clutch means for operatively connecting either of said drives and disconnecting the other said clutch means having means for holding it in either connection, double acting electrical operating means for moving said clutch means from either connection to the other, said electrical operating means having one operating element for moving the clutch means into connection with the high ratio drive and a second operating element for moving the clutch means into connection with the low ratio drive, and fluid pressure operated control means having means for momentarily energizing and immediately deenergizing said one element to connect the high ratio drive and having means for momentarily energizing and immediately deenergizing said second element to connect the low ratio.

7. In combination, a variable speed power member, a driven device, a high ratio drive and a low ratio drive connecting said power member and said device, alternately operating clutch means for operatively connecting either of said drives and disconnecting the other said clutch means having means for holding it in either connections, double acting electrical operating means for moving said clutch means from either connection to the other, said electrical operating means having one operating element for moving the clutch means into connection with the high ratio drive and a second operating element for moving the clutch means into connection with the low ratio drive, and control means for momentarily energizing and immediately deenergizing said one element to connect the high ratio drive and for momentarily energizing and immediately deenergizing said second element to connect the low ratio, said control means having means for simultaneously energizing both elements to move said clutch means to a neutral position to disconnect both the high speed and the low speed drive.

8. In combination, a variable speed power member, a driven device, a high ratio drive and a low ratio drive connecting said power member and said device, alternately operating clutch means for operatively connecting either of said drives and disconnecting the other, said clutch means having means for holding it in either connection, double acting electrical operating means for moving said clutch means from either connection to the other, said electrical operating means having one operating element for moving the clutch means into connection with the high ratio drive and a second operating element for moving the clutch means into connection with the low ratio drive, and control means for momentarily energizing and immediately deenergizing said one element to connect the high ratio drive and for momentarily energizing and immediately deenergizing said second element to connect the low ratio, said control means having means for simultaneously energizing both elements to move said clutch means to a neutral position to disconnect both the high speed and the low speed drive, said clutch means being provided with latch means for holding it in the neutral position.

9. In combination, a variable speed power member, a driven device, a high ratio drive and a low ratio drive connecting said power member and said device, alternately operating clutch means for operatively connecting either of said drives and disconnecting the other, said clutch means having means for holding it in either connection, double acting electrical operating means for moving said clutch means from either connection to the other, said electrical operating means having one operating element for moving the clutch means into connection with the high ratio drive and a second operating element for moving the clutch means into connection with the low ratio drive, and fluid pressure operated control means having means for momentarily energizing and immediately deenergizing said one element to connect the high ratio drive and having means for momentarily energizing and immediately deenergizing said second element to connect the low ratio, said control means also including selective switch means responsive to the speed of said power member for momentarily selectively energizing either said one or second element.

10. In combination, a power member, a driven device, a high ratio drive and a low ratio drive connecting said power member and said device, alternately operating clutch means for operatively connecting either of said drives including a shaft portion, an axially movable element upon said shaft portion with means for preventing free relative rotation therebetween, said element being movable in either axial direction said high and low ratio drives each having a friction driving face, a friction element mounted upon said axially movable element with a combined rotational and axial camming arrangement between said elements to move said friction element relative to said axially movable element toward the opposite driving face when rotated in the same direction as the other driving face, and means for moving said axially movable element until the friction element engages either driving face to couple the shaft portion to the other drive and for moving said axially movable element to an intermediate position to disconnect both drives, said rotational and axial camming arrangement including means for holding said axially movable element in either said intermediate position or in engagement with either driving face.

11. In combination, a power member, a driven device, a high ratio drive and a low ratio drive connecting said power member and said device, alternately operating clutch means for operatively connecting either of said drives including a shaft portion, an axially movable element upon said shaft portion with means for preventing free relative rotation therebetween, said high and low ratio drives each having coaxially arranged driving faces rotating in the same direction, a friction element mounted upon said axially movable element with a combined rotational and axial camming arrangement between said elements to move said friction element relative to said axially movable element from one of said driving faces to the other when rotated in said same direction, and means for moving said axially movable element until the friction element touches one driving face and is rotated and carried into engagement with the other driving face.

12. In combination, a power member, a driven device, a high ratio drive and a low ratio drive connecting said power member and said device, alternately operating clutch means for operatively connecting either of said drives including a shaft portion, an axially movable element upon said shaft portion with means for preventing free relative rotation therebetween, said high and low ratio drives each having coaxially arranged driving faces rotating in the same direction, a friction element mounted upon said axially movable element, one of said elements having a generally cylindrical surface provided with a plurality of generally U-shaped ball races each having a very short axial intermediate portion with the remaining portions curving into diverging portions, the other of said elements having ball holding sockets and a ball in each of said sockets extending into one of said races, and means for moving said axially movable element until the friction element touches one driving face and is rotated and cammed into engagement with the other driving face.

13. In combination, a rotatable power member, a driven device provided with a shaft portion, a rotatable high ratio drive and a rotatable low ratio drive connected to said power member, an axially movable element upon said shaft portion with means for preventing relative rotation therebetween, said high and low ratio drives having oppositely facing friction faces, a friction element mounted upon said axially movable element and extending between said friction faces, means for moving said axially movable element in opposite directions until said friction element engages one of the oppositely facing friction faces, and reaction means between said friction element and said axially movable element powered by the engagement of the friction element with one of said faces for moving the friction element firmly into engagement with the opposite friction face.

References Cited in the file of this patent

UNITED STATES PATENTS

| | | |
|---|---|---|
| 1,983,827 | Winther et al. | Dec. 11, 1934 |
| 2,124,097 | Wolfram | July 19, 1938 |
| 2,156,698 | Martin | May 2, 1939 |
| 2,173,661 | Perrine | Sept. 19, 1939 |
| 2,201,118 | Beede | May 14, 1940 |
| 2,264,821 | Zukoski | Dec. 2, 1941 |
| 2,279,986 | Griswold | Apr. 14, 1942 |
| 2,288,114 | Smith | June 30, 1942 |
| 2,535,046 | Curry | Dec. 26, 1950 |
| 2,636,356 | Ryan et al. | Apr. 28, 1953 |
| 2,641,137 | Orcutt et al. | June 9, 1953 |
| 2,649,941 | Doebeli | Aug. 25, 1953 |
| 2,651,210 | Clark | Sept. 8, 1953 |
| 2,658,593 | Doebeli | Nov. 10, 1953 |
| 2,746,261 | Gibson | May 22, 1956 |
| 2,747,385 | Jacobs | May 29, 1956 |
| 2,759,581 | Jacobs | Aug. 21, 1956 |
| 2,762,229 | Coning et al. | Sept. 11, 1956 |
| 2,784,562 | Gamundi | Mar. 12, 1957 |